Sept. 7, 1943. C. A. MATHEY 2,328,658
LINE TENSION INDICATING AND MEASURING APPARATUS
Filed June 19, 1939 3 Sheets-Sheet 2
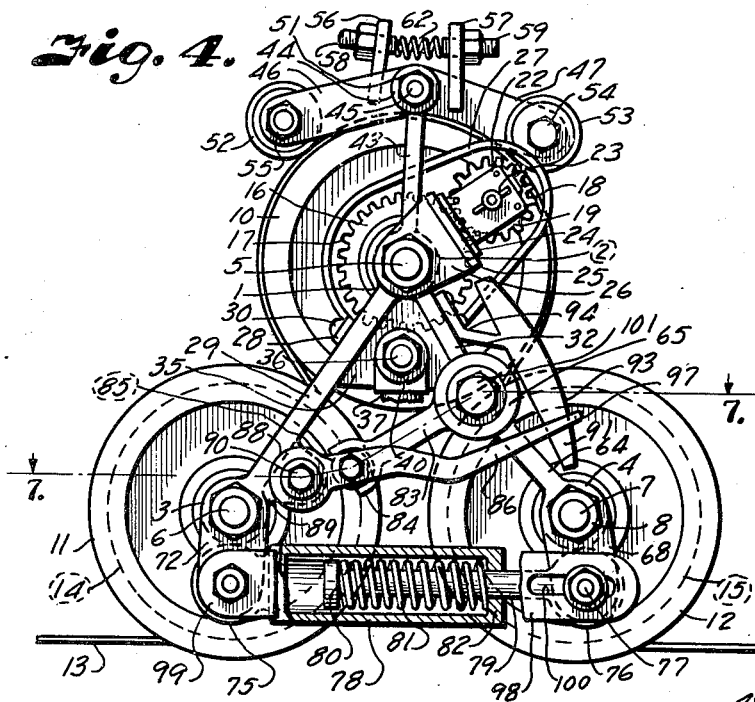
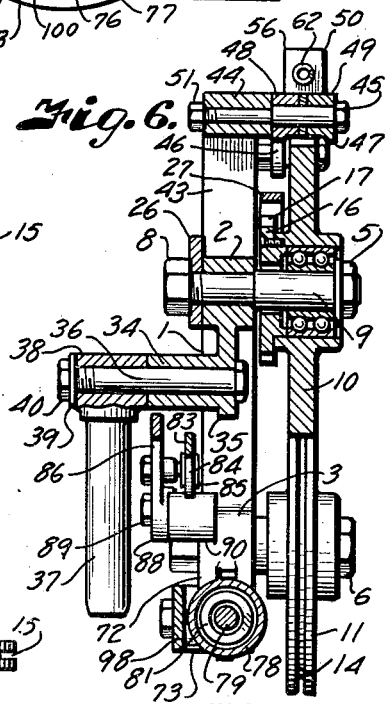
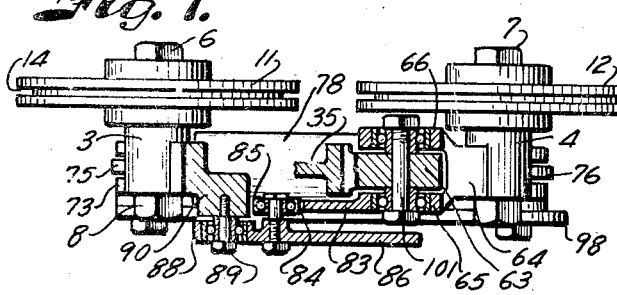
INVENTOR
Chester A. Mathey.
BY Arthur L. Brown
ATTORNEY Sept. 7, 1943.　　　　C. A. MATHEY　　　　2,328,658
LINE TENSION INDICATING AND MEASURING APPARATUS
Filed June 19, 1939　　　3 Sheets--Sheet 3

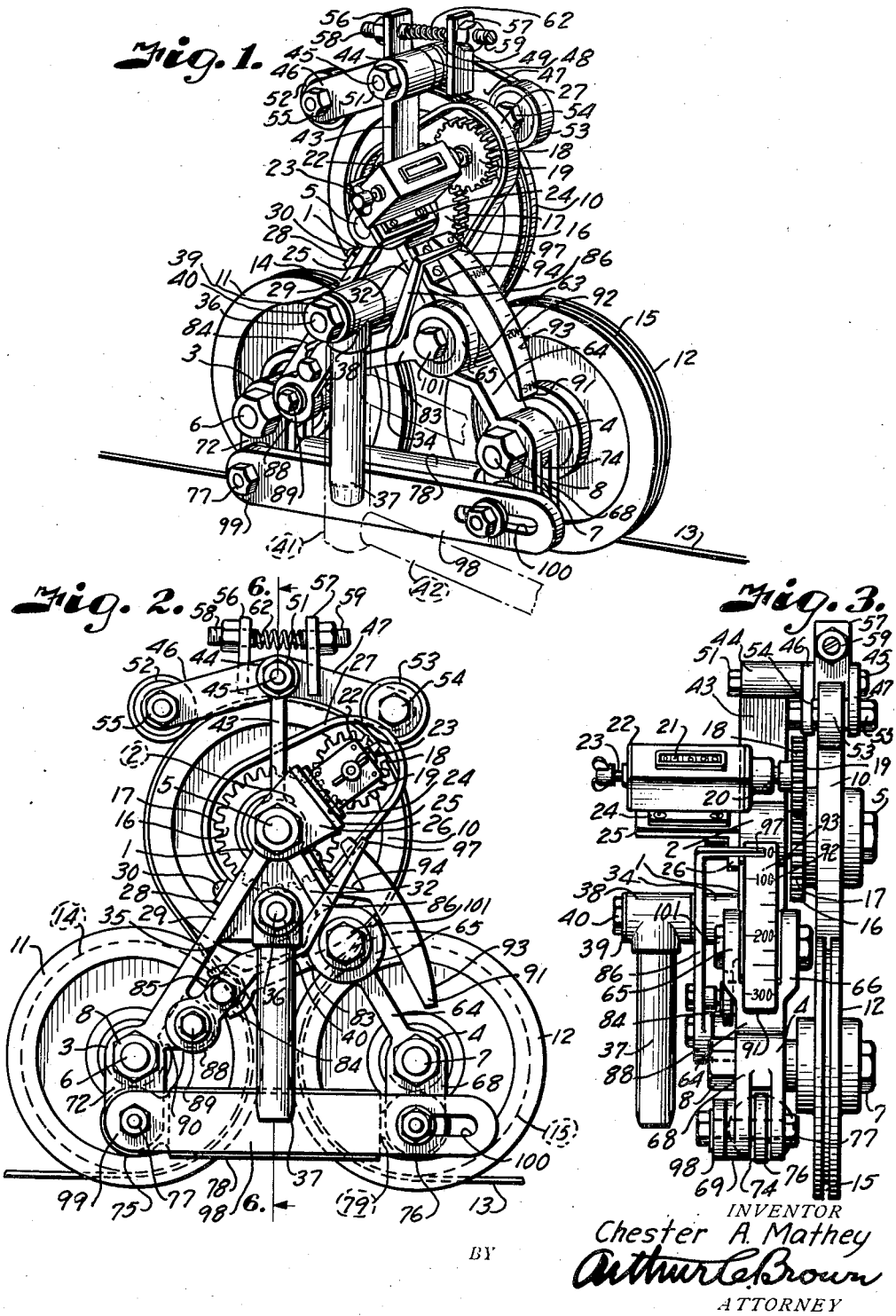

INVENTOR
Chester A. Mathey
BY Arthur le Brown
ATTORNEY

Patented Sept. 7, 1943

2,328,658

UNITED STATES PATENT OFFICE 2,328,658

LINE TENSION INDICATING AND MEASURING APPARATUS

Chester A. Mathey, Tulsa, Okla.

Application June 19, 1939, Serial No. 279,805

5 Claims. (Cl. 265—1.6)

This invention relates to a line tension indicating and measuring apparatus adapted for determining depths and/or locations of instruments in bore holes such as oil wells, together with weight indications of instruments on the line for aiding in judging the character of media through which the instruments pass or with which such instruments come in contact.

The principal object of the present invention is to provide a highly efficient, conveniently arranged and relatively economical combination measure meter and weight indicator.

Other objects of the present invention are to so arrange the indicating elements of the apparatus that they may be conveniently simultaneously observed; to increase extent of contact between the apparatus and the line for preventing slippage therebetween; to increase the effective angular contact between the measuring element of the apparatus and the line for enhancing accuracy of weight and distance measurements; to so arrange the weight and distance indicating elements relative to each other that the accuracy of each is not adversely affected upon actuation of the other; to prevent overloading the weight indicating portions of the apparatus; and to provide improved elements and arrangements of them in the structure of a durable apparatus of this character.

In accomplishing these and other objects of the invention, I have provided improved details of structure, the preferred forms of which are illustrated in the accompanying drawings, wherein:

Fig. 1 is a perspective view of a combination measure meter and weight indicator, embodying the features of the invention and showing the apparatus applied to a line which actuates the apparatus.

Fig. 2 is a front elevational view of the apparatus shown in Fig. 1.

Fig. 3 is an end elevational view of the apparatus, particularly illustrating the convenient arrangement of indicating elements relative to each other.

Fig. 4 is a front elevational view showing the effect of a weight on the line for acting on the apparatus to actuate the weight indicating element.

Fig. 5 is a plan view of the measure meter and weight indicator.

Fig. 6 is a vertical central section through the apparatus substantially on the line 6—6, Fig. 2.

Fig. 7 is a horizontal section through the apparatus substantially on the line 7—7, Fig. 4.

Figure 8:
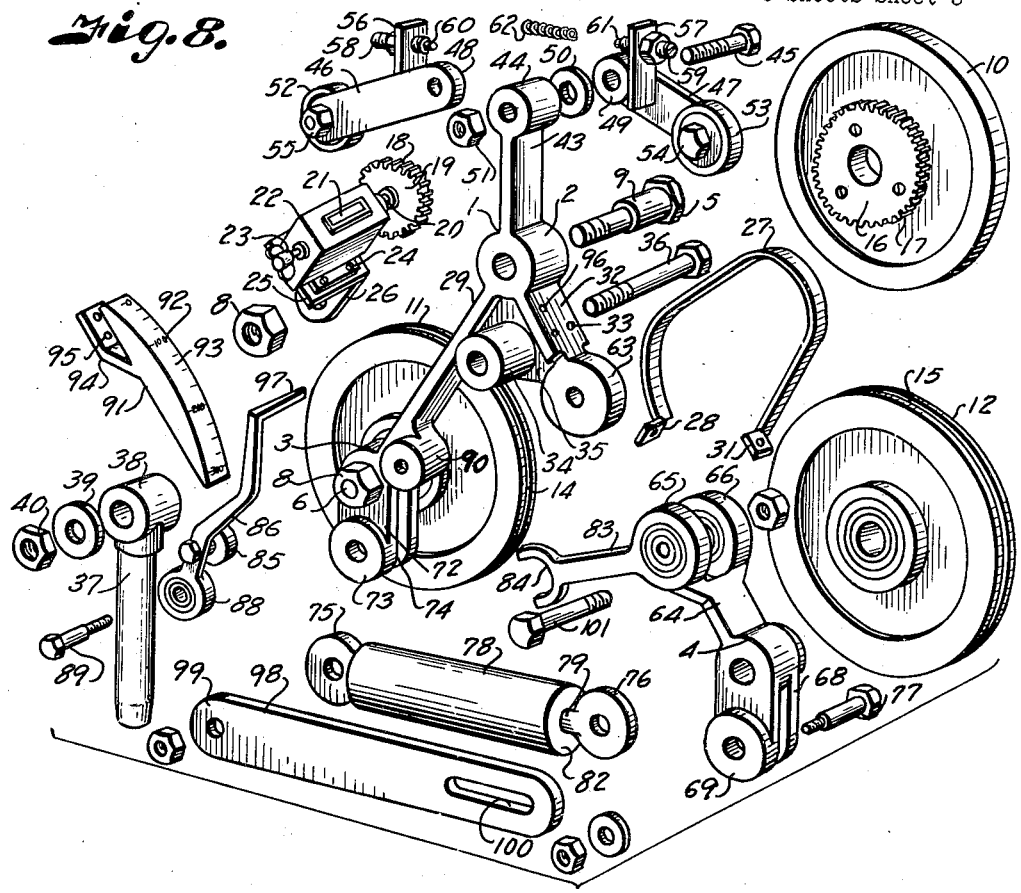
Fig. 8 is a detail perspective view of the measure meter and weight indicator, the parts thereof being shown in spaced disassembled relation to each other.

Referring more in detail to the drawings:

1 designates a frame which is preferably of substantially triangular shape having diverging legs 29 and 32 which are provided at their apex and terminal ends with hubs 2, 3 and 4 having substantially centrally disposed apertures therein for receiving the shanks of headed bolts or similar retaining devices 5, 6 and 7, which are retained in the hubs by suitable fastening devices, such as nuts 8.

Each of the bolts is provided with bearing portions 9, Fig. 8, on which a measuring wheel 10, and tension wheels 11 and 12 are rotatably mounted at the rear side of the frame 1 relative to Figs. 1, 2 and 8.

The preferable arrangement of the wheels 10 to 12 relative to each other is such that the tension wheels 11 and 12 are adapted to have a line 13 passed over the wheels in grooves 14 and 15 of adjacent portions of the wheels 11 and 12, as shown in full lines in Fig. 1 and in dotted lines in Fig. 2. The arrangement of the measuring wheel 10 relative to the wheels 11 and 12 is such that the line 13 may be passed over portions of the wheel 10 remote from the adjacent portions of the wheels 11 and 12 which are engaged by the line.

The desired effect of this arrangement is that the line is drawn around more than one-half of the circumference of the measuring wheel 10 and a greater frictional engagement of the line with the wheel 10 thus results, which makes movement of the wheel 10 positive in response to movement of the line.

In order to register movements of the measuring wheel 10, it is provided, preferably on its inner surface, with a concentrically arranged gear wheel 16, the teeth 17 of which have meshing engagement with the teeth 18 on a pinion 19. The pinion 19 is provided with an axial driven shaft 20, Fig. 8, which is operatively connected with a suitable registering element or length of line metering device 21 in a housing 22, the registering element being provided with a suitable setting apparatus 23.

In order to support the registering element, the housing 22 therefor is provided with a base 24, which is fixed to an outwardly extending flange 25 of an angle bracket, the other flange 26 of which extends laterally of the flange 25. The flange 26 is provided with an aperture adapting it for engagement upon the shank of the bolt 5, the nut 8 of which retains the angle bracket in desired position for aligning the pinion 19 in meshing relation with the gear wheel 16.

It has been found desirable to provide a guard 27 for the gear wheel 16 and pinion 19, which guard is preferably in the form of a metal plate having one end 28 thereof secured to the leg 29, Fig. 2, of the frame, as by a fastening device 30, the other end 31, Fig. 8, of the guard being mounted on the leg 32 of the frame by a fastening device through the guard and an aperture 33 in the frame leg 32.

In order to support the measuring apparatus, the frame 1 is provided with a forwardly projecting hub 34, which may be mounted on a gusset or like plate 35, the hub 34 having an aperture therein for passing a headed bolt or the like 36. A standard 37 is provided with an apertured boss 38 engaged with the threaded end of the bolt 36, which boss may be secured in position on the bolt by a washer 39 and a fastening device such as a nut 40, the boss being arranged to allow pivotal movement of the measuring apparatus relative thereto. If desired, the standard 37 may be mounted in a socket or the like 41, which socket may be supported by suitable base members 42, the socket and base members being shown in dotted lines in Fig. 1.

With the construction thus far described, it is apparent that when a line is placed or threaded through adjacent portions of the wheels 11 and 12 and over remote portions of the wheel 10, movements of the line relative to the wheels cause the measuring wheel 10 to move for actuating the registering element or metering device 21 to give a true measure of the length of line passed over the wheels.

It is sometimes desirable to positively aid the line 13 to engage the measuring wheel 10, and to this end, the frame 1 is provided with an upwardly extending arm 43 having a hub 44 at its upper end provided with an aperture for receiving the shank of a bolt or the like 45. Finger elements 46 and 47, having apertured bosses 48 and 49 on the inner adjacent ends thereof, are mounted on the bolt 45 at the rear end of the hub 44 and washers or the like 50 may be interposed between the hub and apertured bosses, the finger elements, washers and boss being held in desired relative position by a head on the bolt and a suitable fastening device 51. Mounted on the ends of the finger elements 46 and 47 opposite the apertured bosses 48 and 49 are rollers 52 and 53, these rollers being mounted on the inner faces of the finger elements, and being held in rotatable position thereon in a suitable manner, as by headed bolts 54 and fastening devices 55.

With the arrangement illustrated, it is apparent that the rollers 52 and 53 are in substantially the same plane, and substantially centrally relative to the hub 44 in engaging contact with the line to hold it on the wheel 10 and enhance frictional engagement between the wheel and the line for effecting greater accuracy in measuring the length of the line.

In order to resiliently urge the rollers 52 and 53 into frictional engagement with the line or wheel 10, each finger element 46 and 47 is provided with an upwardly extending bracket 56 and 57. Apertures are provided in the brackets adjacent the upper ends thereof for passing set or like screws 58 and 59, the inner ends of which are reduced in diameter to form seats 60 and 61 for opposite ends of a spring 62. It is apparent, then, that the spring 62, when applied to the set screws, and the finger elements being pivotally mounted on the bolt 45, the spring 62 tends to spread the brackets 56 and 57 apart, and the rollers into frictional engagement with the line on the wheel 10.

As above noted, it is contemplated that the measuring device embodying this invention have incorporated therein devices cooperative with the devices for measuring the length of line which are capable of efficiently registering the weight of the line and/or an instrument on the line for the purpose of indicating the character of media through which the instrument is passing.

In carrying out this feature of the present invention, the leg designated 32 is provided with a hinge joint including an apertured boss 63 which is adapted to pivotally connect with terminal end 64 of the leg 32.

The terminal portion 64 is provided with a pair of spaced apertured bosses 65 and 66 which are sleeved over the boss 63 on opposite sides thereof, a bolt 101 being passed through the apertures of the bosses as shown in Fig. 1. The outer end of the terminal carries the hub 4 having a downwardly extending lug or foot portion 68, the lower end of which is provided with another apertured boss 69. Attention is directed to the fact that the axis of the hinge joint is substantially near the peripheries of the wheels 10 and 11 so that movement of the wheel 11 relative to the hinge joint does not materially change the extent of line engagement with the respective wheels.

The boss 3 substantially similar to the boss 4, is provided on the terminal of the leg 29 of the frame, which boss is provided with a lug or foot portion 72 and apertured boss 73 at its lower end similar to the foot portion 68 and boss 69 on the leg portion 64 of the frame.

The lug or foot portions 68 and 72 are preferably split from their lower ends to a point adjacent the bosses 3 and 4, as indicated at 74, for passing ears 75 and 76 between the inner and outer surfaces thereof, as clearly shown in Fig. 3. Headed bolts or similar fastening devices 77 may then be provided for pivotally mounting the ears 75 and 76 in the lug or foot portions of the leg members.

As shown in Fig. 4, the ears 75 and 76 are respectively engaged with a spring housing 78 and a rod 79, the rod being suitably mounted within the housing and being provided with a head 80 at its end remote from the ear 76. A coil spring 81 of predetermined strength in relation to the work it is to do is mounted on the rod 79 and bears at one end on the head 80 and at its other end on the apertured end wall 82 of the housing 78.

It is thus apparent that when weight is applied to one end of the line 13 the line being applied to the measuring apparatus, the wheel 12 pivots or spreads relative to the other wheels against tension of the spring 81.

In order to make this structure effective for indicating or measuring the amount of weight on the line, the terminal portion 64 is provided at its upper end with an arm 83 directed in a downward and left hand direction relative to the leg member 64, Figs. 2 and 4.

The end of the arm 83 is provided with a yoke 84 which is engageable about a roller 85 extending laterally and rearwardly from a pointer arm 86. The lower end of the pointer arm is provided with an apertured boss 88 adapted to be mounted on the shank of a headed bolt or the like 89, the inner threaded end of which bolt is adapted for threaded engagement in the threaded aperture of a boss 90 extending outwardly from the lower surface of the frame leg 29 adjacent the upper inner end of the boss 3, as clearly shown in Fig. 8.

91 designates a scale device having suitable indicia 92 on the upper arcuate face 93 thereof for representing, for example, pounds in weight of the line and an instrument on the line. The body member 91 of the indicating device is provided with a supporting bracket 94 preferably on the lower face and upper end of the body member, which bracket is provided with spaced apertures 95 alignable with the spaced apertures 96 in the leg portion 32 of the frame for fixing the indicating device in position on the frame in underlying relation to the laterally turned end 97 of the pointer arm 86, as shown in Fig. 1.

The indicating device 91 is preferably arranged relative to the laterally turned end of the pointer arm in such a manner that when the measuring apparatus is at rest, as shown in Figs. 1 and 2, the end of the pointer lies over the "zero" indicia of the indicating device and when a weight is applied to the line and the wheel 12 is spread against tension of the spring 81, as shown in Fig. 4, the pointer is moved along the indicating device to a point thereon proportionate to the amount of weight applied to the line, as shown in Fig. 4.

While an apparatus constructed as described is effective for efficiently measuring both the length of the line and the weight applied to the line, it sometimes happens that when excessive weights are applied, such weights damage the measuring apparatus. A safety device is therefore provided to protect the measuring apparatus, which preferably consists of an elongated plate 98 having an aperture 99 at one end thereof engageable with one of the bolts 77 securing the ears 75 and 76 to the foot members of the frame and having an elongated aperture or slot 100 adapted to be fitted over the other bolt 77 for allowing limited pivotal movement of the complementary leg member 64, as shown in Figs. 1 and 4 respectively.

The operation of a measuring apparatus constructed as described is as follows:

A line extending from a reel or the like, not shown, as in conventional practice, may be threaded over the inner periphery of the wheel 11, the outer periphery of the wheel 10 and the inner periphery of the wheel 12, after which the end of the line remote from the reel may be secured to a suitable instrument to be lowered into the bore hole, for example, of an oil well. Upon lowering the instrument into the well, frictional engagement of the line with the wheels causes the measuring wheel 10 to move and the gear wheel and pinion to move therewith to actuate the length of line metering device 21. Since the line engages the major portion of the periphery of the wheel 10, and more than on-half of the circumference thereof, slippage of the line relative to the wheel is prevented, and an accurate actuation of the length of line metering device results, with a consequent accurate indication of the actual length of line paid through the measuring apparatus or over the measuring wheel. The rollers on the finger elements also enhance frictional engagement between the line and the measuring wheel due to their resilient mounting on the frame and their spring-caused tendency to force the line downwardly.

Due to engagement of the line at the extremities of the horizontal diameter of the measuring wheel, and also contact of the line with the inner extremity of the horizontal diameter of the pivotally mounted wheel 12, it is apparent that weight on the line 13 tends to straighten the line between these points on the wheels 10 and 12 to thus move the wheel 12 to the right, as in Fig. 4.

This tendency of movement in the wheel 12 acts on the terminal 64 of the leg 32 and causes it to pivot outwardly on the bolt 101. Outward and upward pivotal movement of the terminal 64 causes downward movement of the yoke 84 on the arm 83 and downward pivotal movement of the pointer arm 86, the laterally turned end 97 of which pointer arm is moved a distance downwardly over the indicia bearing face of the indicating device 91 a distance corresponding to the weight on the line 13.

It is further apparent that the weight on the line is indicated simultaneously with registration of the length of line paid through the apparatus and that, due to the arrangement of the indicating device and registering elements relative to each other, change in weight incidental to the buoyant action of the well fluids on the instrument being run into the well can be noted by the position of the pointer and the length of the line paid out between changes of the position of the pointer, this distance being the depth of media through which the instrument is passing.

Should the weight or pressure become excessive on the line, the spring 81 is compressed to its limit, and the bolt 77 on the foot portion 68 of the leg terminal 64 rides to the outer limit of the elongated slot 100 where it is stopped by the end of the plate 98 and thus prevents damage to the measuring apparatus.

Some of the advantages of a measuring apparatus constructed in accordance with this invention are that accurate measurements of weight and distance may be made regardless of slack on the line or the angle of the instrument and of the line relative to the measuring apparatus. The several measuring devices in the organization do not affect the accuracy of the others and the apparatus cannot be overloaded. A material convenience is also worked in the arrangement of the measuring devices proper relative to each other, which permits an operator to observe both indications simultaneously and with no greater effort than when observing one indication.

What I claim and desire to secure by Letters Patent is:

1. An apparatus for measuring the load on a line of the character described including, a frame having triangularly diverging legs, a wheel having fixed rotational support at the apex of said legs, a pair of line tension wheels having pivotal support on the terminal ends of said legs, a hinge joint in one of said legs whereby one of the tension wheels is adapted to move to and from the other, means yieldably connecting the terminal ends of said legs including a spring housing connected with one of the legs, a rod slidable therein, a spring on the rod, a lever connected with said hinged leg and movable responsive to movement of the hinged tension wheel, a pointer having pivotal connection with the other of said legs and connected with and movable by movement of the lever, and a scale cooperating with the pointer for indicating relative movement of said hingedly mounted tension wheel responsive to pull of the line when the line is tensioned over adjacent faces of the tension wheels and around the first named wheel.

2. An apparatus for measuring the load on a line of the character described including, a frame having triangularly diverging legs, a wheel having fixed rotational support at the apex of said legs, a pair of line tension wheels having pivotal support on the terminal ends of said legs, a hinge joint in one of said legs whereby one of the tension wheels is adapted to move to and from the other, means yieldably connecting the terminal ends of said legs to yieldably restrain movement of said movable tension wheel from the other tension wheel, and indicating means having operative connection with the movable portion of the hinged leg for indicating relative movement of said movably mounted tension wheel responsive to pull of the line when the line is tensioned over adjacent faces of the tension wheels and around the first named wheel.

3. An apparatus for measuring the load on a line of the character described including, a triangular frame, a wheel having fixed rotational support on the apex of the frame, a pair of line tension wheels carried by the base extremities of the frame and arranged in substantial radial symmetry with respect to the first named wheel, means mounting one of the tension wheels on the frame for movement about an axis substantially registering with the perimeter of the first named wheel and the perimeter of the tension wheel which is mounted by said means whereby said pivotal movement has substantially no effect on the extent of the line when the line is engaged with said wheels, means yieldably connecting the movably mounted tension wheel with said frame to yieldably restrain movement of said movably mounted tension wheel from the other tension wheel, and indicating means for indicating relative movement of said movably mounted tension wheel responsive to pull of the line tensioned over adjacent faces of the tension wheels and around the first named wheel.

4. An apparatus for measuring the load on a line of the character described including, a triangular frame, a wheel having fixed rotational support on the apex of the frame, a pair of line tension wheels carried by the base extremities of the frame and arranged in substantial radial symmetry with respect to the first named wheel, means movably mounting one of the tension wheels on the frame for movement to and from the other of said tension wheels, lugs on the frame and mounting means extending laterally with respect to the axes of the tension wheels and on the side of the axes opposite from the first named wheel, a member connected with one of the lugs, a member connected with the other lug, a spring interconnecting said members to yieldably restrain movement of said movably mounted tension wheel from the other tension wheel, stop means for limiting maximum movement of said movably mounted tension wheel, and indicating means for indicating relative movement of said movably mounted tension wheel responsive to pull of the line when the line is tensioned over adjacent faces of the tension wheels and around the first named wheel.

5. An apparatus for measuring the load on a line of the character described including, a frame having triangularly diverging legs, a wheel having fixed rotational support at the apex of the diverging legs, line tension wheels carried by terminal ends of said legs and arranged in substantial radial symmetry with respect to the first named wheel, one of said legs having a pivotal joint whereby the tension wheel carried by said leg is adapted to move to and from the wheel on the other leg, the pivotal axis of said joint being positioned near the perimeters of the first named wheel and the movable tension wheel, means yieldably connecting the terminals of said legs to yieldably restrain movement of said movably mounted tension wheel from the other tension wheel, a lever connected with said jointed leg, a pointer pivoted on the other leg and connected with said lever for movement therewith, and a scale cooperating with said pointer and indicating relative movement of said movably mounted tension wheel responsive to pull of the line when the line is tensioned over adjacent faces of the tension wheels and around the first named wheel.

CHESTER A. MATHEY.